Feb. 3, 1925.
L. E. GODFRIAUX
1,524,860
TOOL FEED DEVICE FOR LATHES
Filed Nov. 18, 1922  2 Sheets-Sheet 1
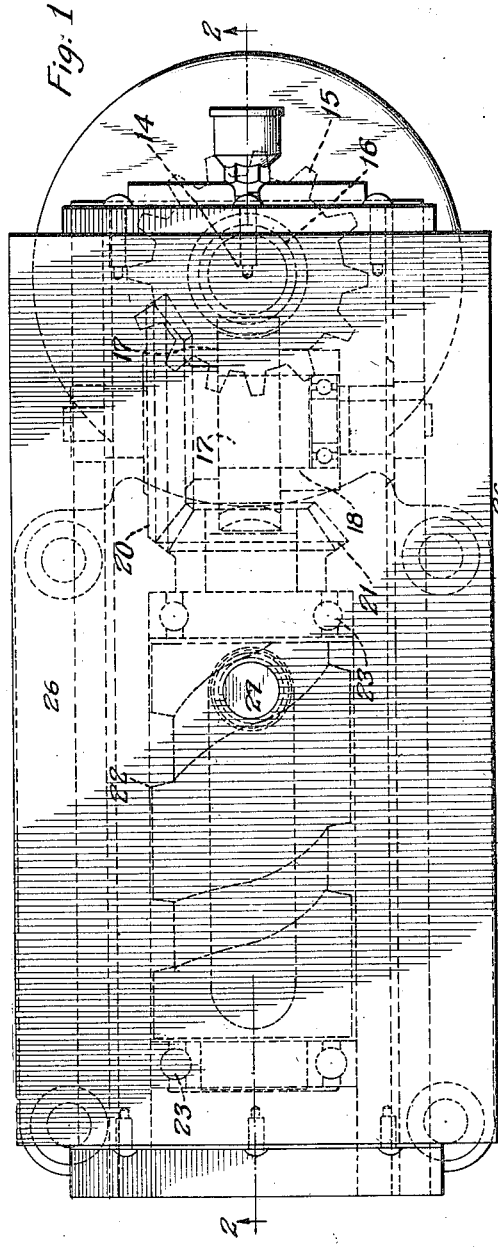
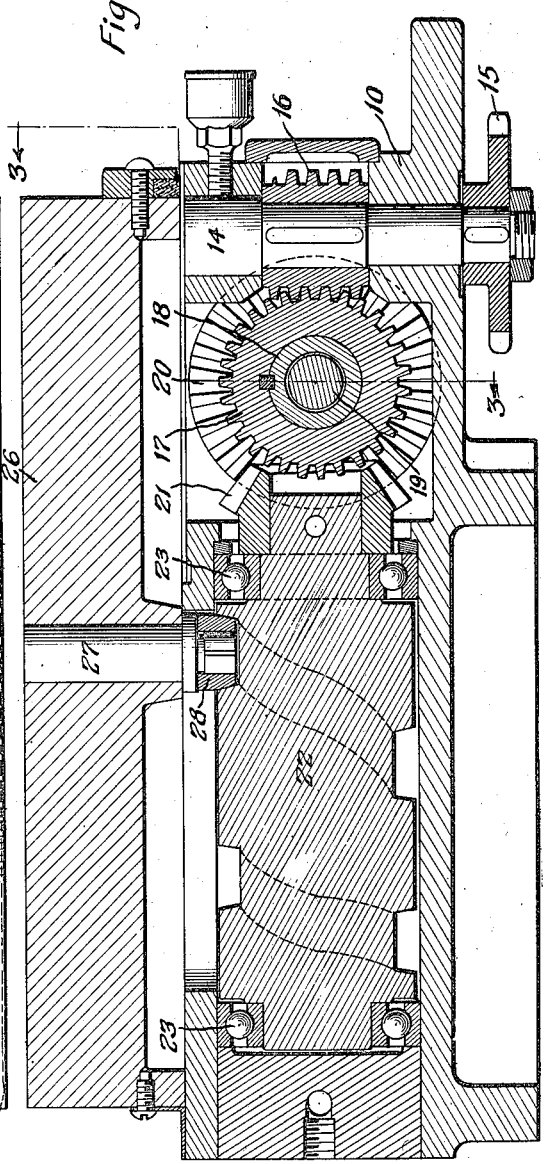
Witness:
Harry H. Hitzeman
Inventor
Louis E. Godfriaux.
By Samuel N. Pond,
Atty.

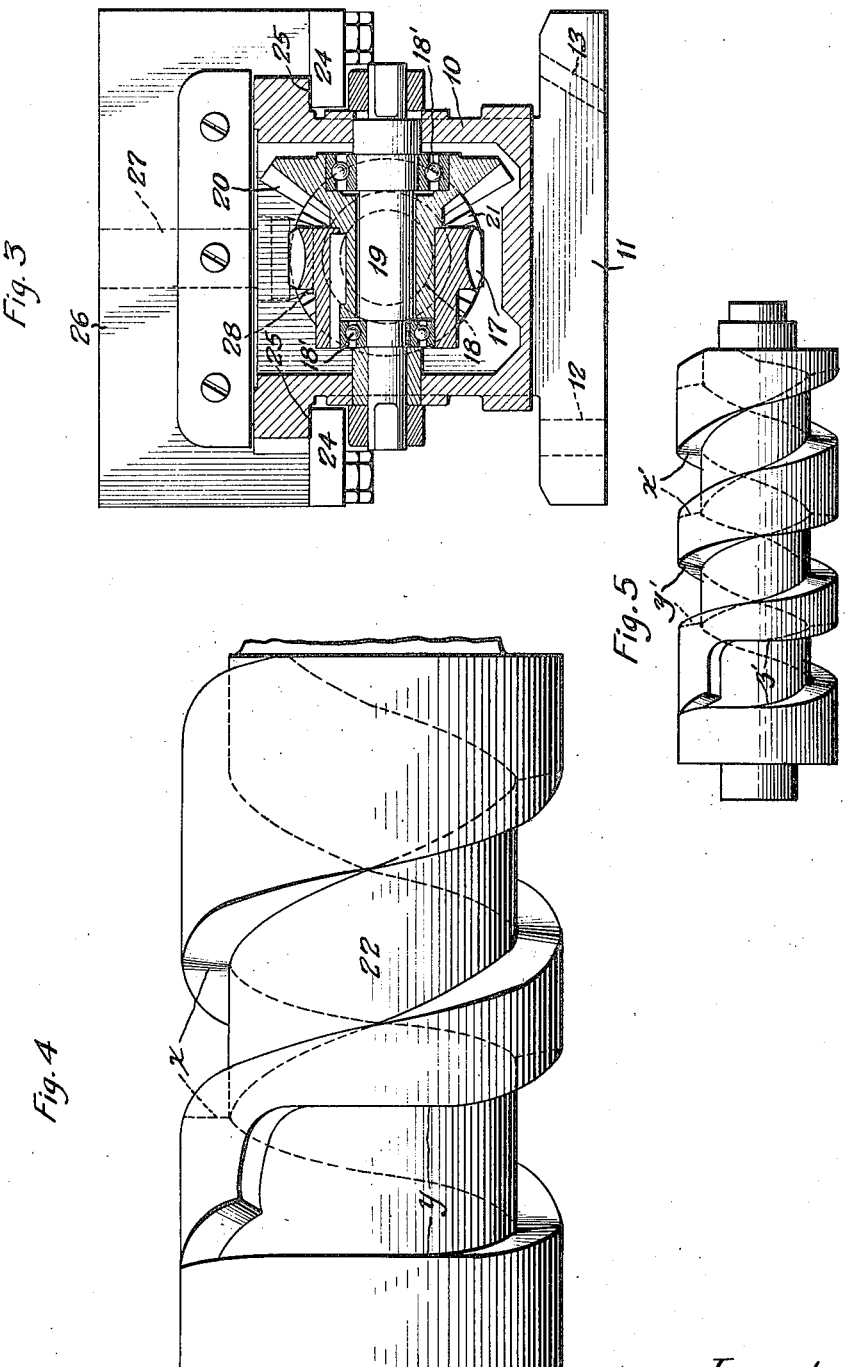

Patented Feb. 3, 1925.

1,524,860

UNITED STATES PATENT OFFICE.

LOUIS E. GODFRIAUX, OF MADISON, WISCONSIN, ASSIGNOR TO GISHOLT MACHINE COMPANY, OF MADISON, WISCONSIN, A CORPORATION OF WISCONSIN.

TOOL-FEED DEVICE FOR LATHES.

Application filed November 18, 1922. Serial No. 601,726.

*To all whom it may concern:*

Be it known that I, LOUIS E. GODFRIAUX, a citizen of the United States, residing at Madison, in the county of Dane and State of Wisconsin, have invented certain new and useful Improvements in Tool-Feed Devices for Lathes, of which the following is a specification.

This invention relates to an improved device for effecting the advance, feed and back traverse movements of a cutting tool toward and from work mounted in a lathe chuck; and the invention has been designed more particularly for use on a lathe of the type disclosed in an application for Letters Patent filed by me on the 31st of May, 1921, Serial No. 473,655. In the aforesaid application I have disclosed a lathe characterized by a flat broad table slidably mounted on the ways of the lathe bed and one or more tool carriers capable of being mounted on said table at any desired angle to the axis of the chuck, each of said tool carriers comprising a base and a tool holder slidably mounted on said base, with feed mechanism mounted in the base for effecting the travel of the tool holder and tools toward and from the work; together with a single drive shaft journaled in the rear end of said table and constantly geared at its lower end to the feed shaft of the lathe and at its upper end equipped with a flexible transmission to the feed mechanism of the tool carrier or to the feed mechanisms of several of said tool carriers where a plurality are employed. In the aforesaid application I have disclosed a flexible transmission of the chain and sprocket type, and in the present application I have disclosed a feed mechanism adapted to be driven through a similar transmission, but it should be understood that, so far as the present invention is concerned, the particular means through which the power is transmitted is immaterial.

In tool carriers for lathes it is a quite common practice to equip a single tool holder with a plurality of cutting tools which are successively brought into engagement with the work. Heretofore, where this has been done it has been necessary to reduce the rate of feed to that which can be successfully employed when all of the several tools are engaged with the work, in order to avoid injury to the latter or overloading of the machine. This, of course, involves some waste of time, because necessitating a slower rate of feed for the first tool or the first and second tools, which engage with the work than would otherwise be necessary. In other words, it has been necessary to reduce the rate of feed to that at which all of the tools can successfully effect a simultaneous cutting operation.

The main object of the present invention is to provide an improved feed mechanism which shall provide a variable rate of feed, which shall be greatest while the first tool alone is operating, shall be automatically reduced when the second tool comes into operation during the work of the first tool, and may be still further reduced where a third or fourth tool may later come into operation during the working of the preceding tools, and which shall effect a quick advance to get the tool or tools into cutting position.

A further object of the invention is to provide in a variable feed mechanism of the character above outlined a simple means for arresting the feed during a few spindle revolutions to erase the tool mark from the work.

To the attainment of the above stated objects, my invention, in the preferred embodiment thereof herein shown, comprises a tool base, a tool holder slide mounted on said base, and a feed mechanism mounted in said base and drivingly connected to said tool holder slide and including as an element thereof a rotary cylinder formed with helical slide advancing cam surfaces of varying pitches, whereby the tool holder slide is first advanced a certain distance at a given speed, and is then further advanced at a reduced rate or rates of speed as another tool or other tools are successively brought into cutting relation to the work.

The tool feed mechanism of my present invention, its novel structural features, and the advantages flowing therefrom will be readily understood by those skilled in the art from the following detailed description, taken in connection with the accompanying drawings in which I have illustrated one simple and practical embodiment of the principle of the invention, and wherein—

Fig. 1 is a top plan view of a tool base and tool holder or slide mounted thereon;

Fig. 2 is a vertical axial section taken on the line 2—2 of Fig. 1;

Fig. 3 is a vertical transverse section taken on the line 3—3 of Fig. 2;

Fig. 4 is an enlarged detail elevation of the variable spiral cam, having two sections of different pitch and an idling portion at its inner end; and Fig. 5 is a view similar to Fig. 4 showing a spiral cam having three sections of different pitch and an idling portion at its inner end.

Referring to the drawings, 10 designates a generally box-like tool holder base formed with an integral base plate 11 equipped with holes 12 and 13 (Fig. 3) by which it may be strongly secured in any desired position to the top surface of the lathe table by screw bolts and dowels (not shown). In the rear end of the member 10 is journaled a vertical worm shaft 14, having on its lower end a driving sprocket 15. Keyed to the intermediate portion of the shaft 14 is a worm 16 meshing with and driving a worm wheel 17 keyed on a sleeve 18 that is rotatably mounted, preferably by ball bearings 18' (Fig. 3) on a cross shaft 19 supported in and between the side walls of the member 10. Also integral or fast with the sleeve 18 is a bevel gear 20 meshing with and driving a bevel pinion 21 that is keyed to the rear reduced end of a spiral cam designated as an entirety by 22. This spiral cam 22 has reduced portions at its opposite ends by which it is rotatably journaled, preferably through anti-friction bearings 23 in and lengthwise of the tool holder base 10. The working portion of this cam comprises a spiral groove cut in the circumference thereof and extending substantially from end to end of the latter. It will be observed by reference to Fig. 4 that the side walls of the rear portion of the cam groove have a uniform pitch or degree of inclination extending to the point $x$, and that from the point $x$ to the point $y$ the pitch is reduced, while from the point $y$ to the outer end or terminus of the groove the side walls lie at a right angle to the axis.

Slidably mounted on the tool base 10 and confined thereon by the usual gibs 24 engaged with slots 25 in the opposite side walls of the base is the usual tool holder slide 26, to the top of which one or more cutting tools are secured. Mounted in the slide 26 at approximately the center thereof is a vertical post 27, on the lower end of which is mounted a roller 28 engaged with the spiral groove of the rotary cam, in the manner clearly indicated in Fig. 2, whereby as the cam is slowly rotated by the mechanism already described, the slide is fed toward or retracted from the work. Assuming that the slide carries two cutting tools, only one of which is first engaged with the work while the second is later brought into engagement with the work, the steeper portion of the cam will operate, through the roller 28 and post 27 to advance the first tool to the work and feed it throughout that period of travel when the first tool alone is performing a cutting operation. When the roller, however, reaches the point at which the pitch of the cam changes, such as the point $x$, the second tool comes into cutting engagement with the work, and from that point on both tools are engaged with the work until the required cut has been taken, at which time the roller 28 will be at the point $y$. As the cam continues to revolve during a few spindle revolutions, the roller travels from the point $y$ toward the end of the cam groove; but since this portion of the groove is at right angles to the axis of rotation, the feed is arrested during the "clean-up" cut which erases the tool mark.

When the roller has nearly reached the end of the cam groove, the reversal of the direction of the cam tripping mechanism of the machine makes it possible to feed back over the same surface with the cutting tools but in the reverse direction. As there is always some spring when going forward on the roughing cut, the tools when reversed remove the stock left on account of the spring of the tools when cutting in; this readily enables a finishing cut to be made.

From the foregoing it will be seen that in my present invention the speed of the driving mechanism remains constant, and the variations in feed are effected by variations in the pitch of successive portions of the spiral groove of the rotary cam.

To illustrate a further extension of the above described principle of a variable cam, I have illustrated in Fig. 5 a rotary cam wherein the spiral groove embodies three portions of varying pitch or angularity, namely, a steepest portion from the inner end of the spiral to the point $x'$, a less steep portion extending from the point $x'$ to the point $y'$, and a still less steep portion extending from the point $y'$ to the point $z'$.

Although I have illustrated my present invention as adapted to a lathe of the type disclosed in my former application above identified, it is manifest that the invention may be embodied in tool carriers so mounted on the lathe bed as to have only a fixed travel always in one direction.

I claim—

1. In a tool feed mechanism, the combination of a base member, a tool slide mounted on said base member, a cam-engaging member carried by said slide, a cylinder rotatably mounted in said base member and formed with helical slide advancing cam surfaces of varying pitches adapted to successively engage with said cam-engaging member, and mechanism for rotating said cylinder.

2. In a tool feed mechanism, the combination of a base member, a tool slide mounted on said base member, a cam-engaging member carried by said slide, a cylinder rotatably mounted in said base member on an axis parallel with the path of travel of said slide and formed with slide advancing cam surfaces of successively increasing degrees of inclination to the path of travel of said slide successively engaged with said cam-engaging member, and with a terminal surface at right angles to the path of travel of the slide, and mechanism for rotating said cylinder.

LOUIS E. GODFRIAUX.